United States Patent
Gutfreund et al.

(10) Patent No.: US 6,665,835 B1
(45) Date of Patent: Dec. 16, 2003

(54) REAL TIME MEDIA JOURNALER WITH A TIMING EVENT COORDINATOR

(75) Inventors: Steven Gutfreund, Brighton, MA (US); John R. Nicol, Framingham, MA (US); Kimberly Rush, Winchester, MA (US); Christopher M. Martin, Walpole, MA (US); James Paschetto, Lincoln, MA (US)

(73) Assignee: Verizon Laboratories, Inc., Waltham, MA (US)

( * ) Notice: Subject to any disclaimer, the term of this patent is extended or adjusted under 35 U.S.C. 154(b) by 0 days.

(21) Appl. No.: 08/996,690

(22) Filed: Dec. 23, 1997

(51) Int. Cl.$^7$ ................................ G06F 15/00
(52) U.S. Cl. ................ 715/500.1; 715/501.1; 345/723
(58) Field of Search ................ 345/302, 328, 345/327, 723; 709/203; 707/501

(56) References Cited

U.S. PATENT DOCUMENTS

| | | | | |
|---|---|---|---|---|
| 5,388,197 A | * | 2/1995 | Rayner | 713/400 |
| 5,530,859 A | * | 6/1996 | Tobias, II et al. | 345/328 |
| 5,574,787 A | * | 11/1996 | Ryan | 380/201 |
| 5,592,602 A | * | 1/1997 | Edmunds et al. | 345/302 |
| 5,717,879 A | * | 2/1998 | Moran et al. | 707/2 |
| 5,794,249 A | * | 8/1998 | Orsolini et al. | 707/104 |
| 5,801,685 A | * | 9/1998 | Miller et al. | 707/500.1 |
| 5,815,689 A | * | 9/1998 | Shaw et al. | 713/400 |
| 5,818,435 A | * | 10/1998 | Kozuka et al. | 707/500.1 |
| 5,826,102 A | * | 10/1998 | Escobar et al. | 345/835 |
| 5,892,507 A | * | 4/1999 | Moorby et al. | 345/302 |
| 5,966,121 A | * | 10/1999 | Hubbell et al. | 345/726 |
| 6,006,241 A | * | 12/1999 | Purnaveja et al. | 707/512 |
| 6,014,706 A | * | 1/2000 | Cannon et al. | 709/231 |
| 6,031,529 A | * | 2/2000 | Migos et al. | 345/783 |
| 6,154,207 A | * | 11/2000 | Farris et al. | 345/328 |
| 6,199,076 B1 | * | 3/2001 | Logan et al. | 434/319 |
| 6,211,868 B1 | * | 4/2001 | Lin et al. | 434/307 R |
| 6,263,507 B1 | * | 7/2001 | Ahmad et al. | 725/134 |

OTHER PUBLICATIONS

Baecker et al., A Multimedia System for Authoring Motion Pictures, ACM, 1996, pp. 36–42.*

Hardman et al., Structured Multimedia Authoring, ACM, 1993, pp. 1–7.*

Hardman et al., Multimedia Authoring Paradigms, IEEE, pp. 1–3.*

Little et al., Multimedia Object Models for Synchronization and Database, IEEE, 1990.*

(List continued on next page.)

*Primary Examiner*—Stephen S. Hong
*Assistant Examiner*—Cong-Lac Huynh (57) ABSTRACT

A media journaling method and apparatus provides an ability for capturing an event, such as a seminar style presentation with visual aids, in real-time and coordinating other related events as they occur, and then processing the combination to create a synchronized multimedia record of events. The presentation is captured in real-time, and the audio/video converted to digital format, and using post-processing techniques, within a very short period thereafter, the related presentation material such as slides and user notes are combined and synchronized therewith. The new presentation is then made available on a network such as the Internet through a media journal player. The player is, for example, web browser based and allows the user to view the whole presentation, or allows for seeking to different places in the presentation while maintaining the synchronization. A user is able to add new events that are synchronized to the presentation using a timing event coordinator that tracks relative discrete time changes of the new events.

19 Claims, 7 Drawing Sheets

OTHER PUBLICATIONS

Little et al., Interval–Based Conceptual Models for Time–Dependent Multimedia Data, MCL Technical Report, May 1993.*

Ming–Chih Lai et al., "Toward a New Educational Environment," World Wide Web Journal, Issue 1, Dec. 1996, pp. 221–230.

Scott Minneman et al., "A Confederation of Tools for Capturing and Accessing Collaborative Activity," Proc. of Multimedia '95, San Francisco, CA, 1995, pp. 523–534.

Gregory D. Abowd et al., "Teaching and Learning as Multimedia Authoring: The Classroom 2000 Project," Proc. Of Multimedia 96, Boston, MA, 1996, pp. 187–198.

* cited by examiner

REAL TIME MEDIA JOURNALER WITH A TIMING EVENT COORDINATOR

FIELD OF THE INVENTION

The present invention relates generally to multimedia journaling, and more particularly, to an apparatus and method for capturing multimedia content and related information in real time and creating synchronized multimedia records wherein synchronization can be accomplished post multimedia content capture.

BACKGROUND OF THE INVENTION

The value of information collection, integration and distribution is often most greatly impacted by the timeliness with which this can be accomplished. Traditional forms of information communication include presentations to captive audiences (which may also be simultaneously broadcast, for example, via satellite), electronic mail, teleconferencing, videoconferencing, video on demand, etc. More effective communications can often be effected if a multimedia approach is taken that incorporates audio, video and other inputs. Designing and implementing distributed multimedia applications capable of processing and disseminating such media in real-time or near real-time, however, presents formidable challenges.

In fact, most companies still rely on live presentations and classroom instruction in order to deliver information or provide timely training. Even when such live presentations or instruction are provided to other locations via satellite, the time of delivery may be very inconvenient due to business schedules or time zone differences. Alternatively, a video tape may be provided for purposes of time convenience. But such a tape presentation is not necessarily popular since there is a delay in getting the tape and the ability to modify the tape if only a small portion of a presentation needs to be updated (a new slide that reflects more current information, for example) is relatively difficult. Also, while most employees have ready access to a personal computer connected to a network, they typically do not have a video cassette player immediately available.

Multimedia presentation technology has been available for some time, including for training purposes, and while it may be more cost effective in the long run, it has not been widely adopted. One reason for the slow adaptation is the initial time and costs involved in preparing the multimedia presentation, which is typically far greater than the time to prepare the live presentation. Once a multimedia presentation is prepared, however, such presentation is capable to be updated more easily, and hence more cost and time effective to implement than re-preparing or recording an updated live presentation. Furthermore, the multimedia presentation has not been widely adopted because it has not been made immediately available for wide distribution as could be a satellite feed.

Computer and other communication networks, including the Internet, provide viable distribution mechanisms for presenting such multimedia applications. Network related technology is advancing at a very rapid pace, including distributed multimedia applications that are being greatly impacted by rapid technological developments. However, only recently have the elements necessary for the distributed multimedia application, including tools for authoring, audio/video capture and transport, connection management and coordination agents been readily available. The sudden maturation of multiple audio and video encoding technologies in combination with new media server solutions capable of streaming such media in real-time creates significant opportunities in developing new multimedia applications and services.

Media journaling as used herein describes a multimedia application for capturing an event (for example, a lecture style presentation with visual aids) in real-time and coordinating other related events as they occur, and then processing the combination to create a synchronized multimedia record of events. Creating this synchronized multimedia record of events in real-time and making it widely available would provide not only content rich information, but also the timeliness that is so valuable. Furthermore, given that such media journaling may be used for entertainment, information, training, etc., it would be desirable to make the format one that allows the viewer to interact, that is, allows the viewer to search and move about the presentation as desired, and to add additional content in synchronization with the presentation post multimedia record creation.

Accordingly it is desired to provide a method and apparatus for capturing real-time events as they occur and combining and synchronizing therewith related events and making this media journal widely available shortly thereafter, which media journal is editable to include additional synchronized events.

SUMMARY OF THE INVENTION

An object of the present invention is to provide an improved real-time multimedia journaling application.

Another object of the present invention is to provide an improved multimedia journaling application that provides for user interaction.

Still another object of the present invention is to provide a real-time multimedia journaling application that is editable by a user to add other synchronized events.

According to a first embodiment of the present invention, a method in a timing event coordinator, a method of creating a multimedia presentation of a recordable event having time related components. The multimedia presentation is created within minutes of the end of the recordable event. The method includes the steps of capturing a movie of the recordable event and capturing time stamp information for synchronizing the time related events to the recordable event. The movie is marked with reference marks. The time related components are time to the movie, wherein each time related component of the time related components can have time stamps that are independent of each other. A file is created indicating a type for each of the time related components and their corresponding time stamps and an index for each time related component. The file is made available to an application to allow the time related components to be processed according to the status of the movie. A video stream is then generated including the movie with captured time stamp encoded therewith. Finally, the video stream is placed in storage for retrieval by a journal player.

In another embodiment of the present invention, The timing event coordinator is described having an command input to receive a command to set a relative time to a user specified time. A special flag is provided that can be set identifying, and hence later determining whether a special flag exists in any of the time related component types. The timing event coordinator processes any requirements dictated by a special flag. The timing event coordinator also has a comparator for determining whether any time related components have a time stamp matching the relative time. The timing event coordinator includes an interface for instructing the media player for displaying the appropriate time related components according to the special flag and time stamps associated therewith.

The foregoing and other objects, features, and advantages of the invention will be apparent from the following more particular description of a preferred embodiment of the invention, as illustrated in the accompanying drawing.

DETAILED DESCRIPTION

Figure 1:
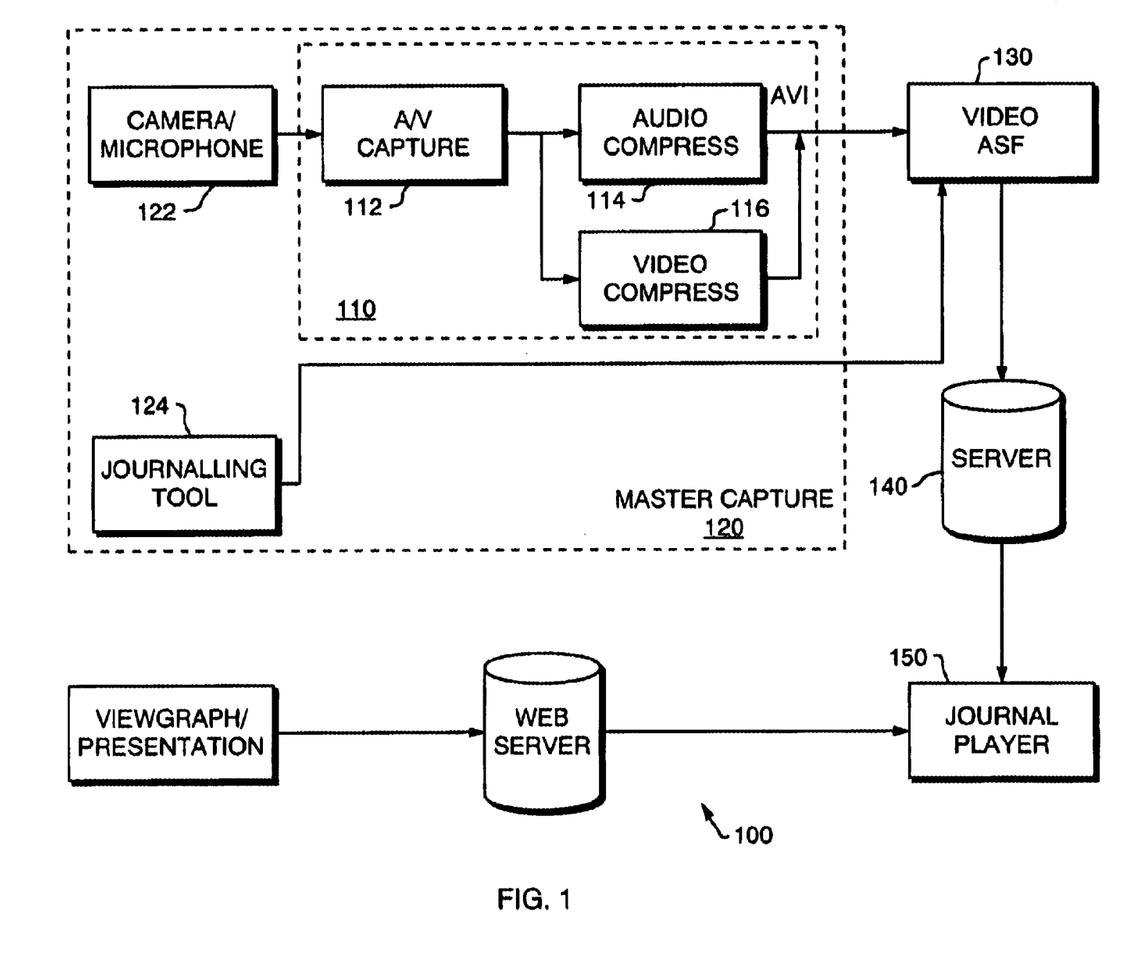
FIG. 1 is a high level block diagram depicting a distributed multimedia journaling system.

Referring now to the figures, and for the present to FIG. 1, a block diagram of a media journaling application is depicted. The Media journaler, in broad terms, provides users with a capability to capture multimedia content and related information to create a synchronized multimedia presentation. For example, a seminar style presentation may be captured digitally in real-time and using certain post-processing techniques, within a very short period thereafter, additional information is combined and synchronized therewith. The new presentation is then made available on a network such as the Internet through a media journal player. The player is, for example, web browser based and allows the user to view the whole presentation, or allows for seeking to different places in the presentation while maintaining the synchronization. Various aspects and components will be described in detail presently.

FIG. 1 shows a media journaling system 100 which includes an audio/video capture digitizer 110 that works within a master capture 120 to create and capture an audio/video presentation for further combination with other inputs, for example, a viewer's notes or a presenter's slides. The audio/video master capture 110 includes an audio/video capture 112 which is adapted to receive, for example, an analog video or audio signal, or both (hereinafter referred to as an audio/video signal). The captured audio/video signal is converted to corresponding digital signals that are further compressed in the audio compressor 114 and video compressor 116. The audio/video capture and digitizer 110 is well known and readily available on the commercial market, for example, a Winnov Videum AV card.

The master capture 120 includes a camera/microphone 122 for actually recording an audio/video event. The output of the camera/microphone 122 is typically an analog output that would require digitization and compression by the audio/video capture and digitizer 110. However, one of ordinary skill in the art will recognize that with the increased availability of digital audio/video recording devices that an audio/video interleaved (AVI) output can be immediately available such that the audio/video capture and digitizer can be bypassed in its entirety.

Figure 2:
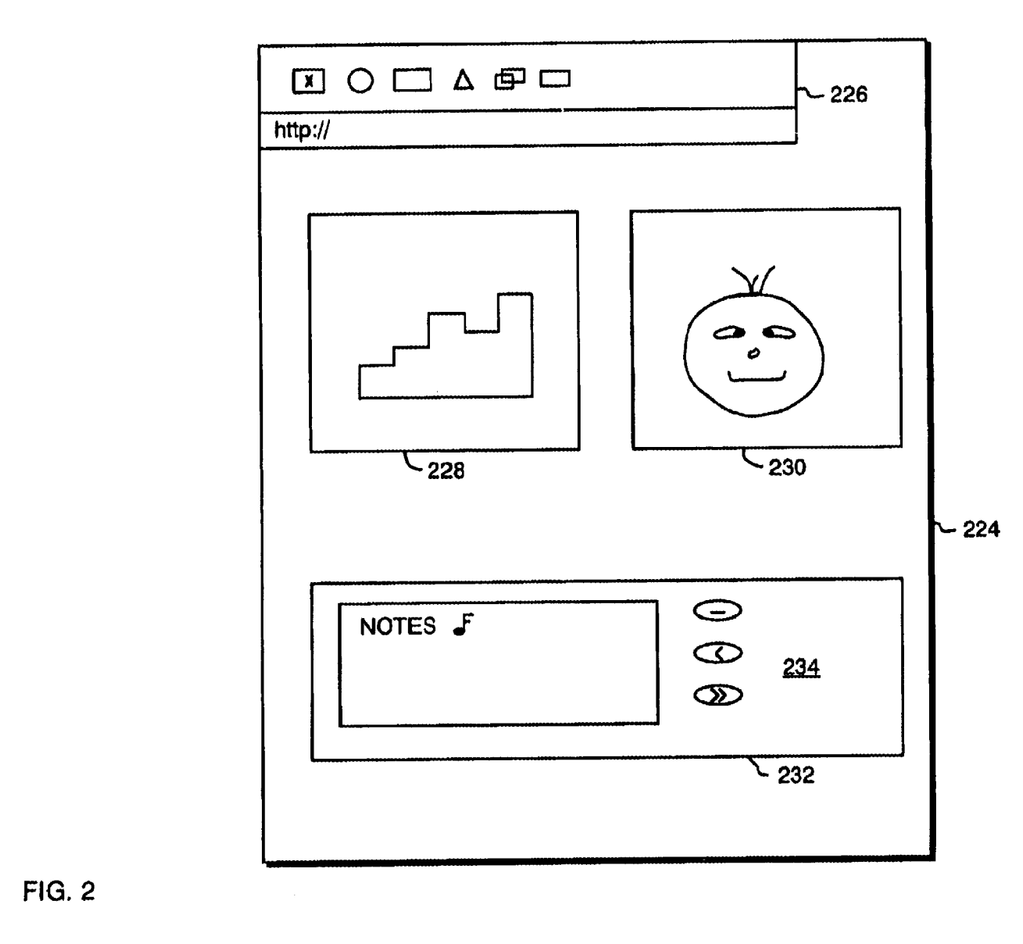
FIG. 2 is a diagram of a user interface of a journaling tool of FIG. 1.

In FIG. 2 a user interface for a journaling tool 224 (shown in FIG. 1 as journaling tool 124) is shown, wherein a journaling console (embodied in a personal computer for example). The journaling tool 224 is part of the master capture 120 that is eventually connected to a server 140. The journaling tool 224 is operated by a journaler responsible for capturing and/or receiving the audio/video stream (for example, by having the camera/microphone connected and controllable from the journaling console), and time stamping the associated change events, e.g., time stamping the viewgraphs. In addition, user-notes can also be captured or input as part of the event. Alternatively, the presenter could cause the generation of the time stamps in an automatic manner, for example, by the action of selecting a next slide, or previous slide from presentation software. Still further, one could envision heuristic techniques usable to predict time change events by taking advantage of video content analysis algorithms.

The Journaling tool 224 monitors real-time capture of the audio/video stream originating from a presentation, for example. This audio/video stream capture is accomplished via an NTSC analog feed from the on-location camera to the journaling console. Of course, the journaler can be physically remote given a proper remote conduit for delivering the feed (internet, satellite, radio, etc.). The journaling console, in this instance, would include a video digitizer card (audio/video capture and digitizer), unless of course the video feed was digital. In any event, the result of this step is a single audio/video interleaved (AVI) file containing, for example, the talking-heads component of the presentation.

In addition to the audio/video feed, the journaler uses the journaling tool 224 to record other presentation information. This includes textual notes taken at the time of the presentation and would naturally accompany the other captured media. The notes would typically change with slide change components. These notes could be created with time stamp information during a subsequent playback, which would require essentially re-compiling the journaled event. However, as will be later described, a method is available for creating multiple sets of notes for inclusion in the presentation with their own distinct time stamps.

Referring again to FIG. 2, the journaling tool user interface 224 is shown incorporated into a standard web browser 226, for example, Netscape Navigator or Microsoft Internet Explorer. One of skill in the art will also recognize that an alternative to an existing web browser is a stand-alone solution, which application can readily access, for example, the world wide web or other network. Real time video is viewed in video display 230 and electronic view graphs are viewable in presentation display area 228. In the lower panel of the journaling tool user interface 224 is the notepad 232 and control buttons 234. When journaling begins, a first control button, a start button is selected thus starting an internal clock within the journaling tool user interface 224. The clock creates a time reference for all other events of interest during a journaled event. During the journaled event, the journaler is able to enter notes in note section 232. Every time an event needs to be coordinated, for example, when a view graph is changed, the journaler clicks on a viewgraph change button of the control buttons 234. Each event results in three actions: (1) a time stamp is generated and added to a time stamp log file; (2) the viewgraph display is updated to display the current view graph; and (3) the note pad 232 advances to display a new note page. At the end of a presentation a "save log" button of the control buttons 234 is selected in order to record the event time stamps to storage (i.e., to disk). Netshow Player 2.0 (available from the Microsoft Corporation) is useful to integrate the time stamp information. Alternatively, using a timing event coordinator as described herein, the viewgraph and note pad could advance independently of each other.

The journaling tool 124 can either be physically co-located or physically remote to the journaled event location. If co-located, the journaling tool 124 will include a digitizing PC, video source (from camera), and audio input (local microphone). Available video capture software located on the digitizing PC, includes VidCap from Microsoft Corporation (which does not compress audio) or Premiere from Adobe. When the journaling tool 124 is physically remote from the journaled event, the journal event's audio/video feed can be supplied in analog form via a cable, for example. The audio/feed can also be transported in digital form (assuming the feed is digital) via a local area network, for example.

Figure 3:
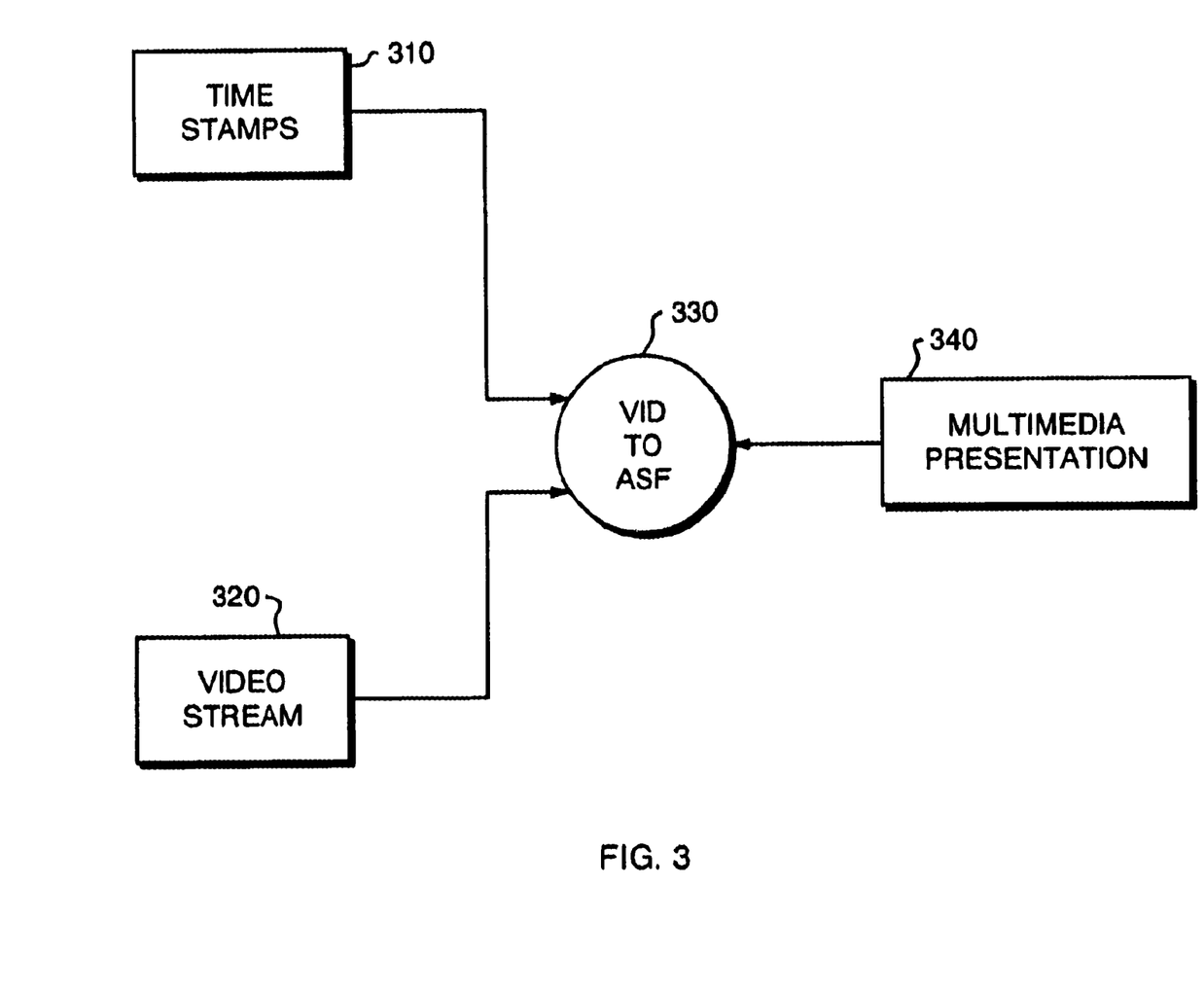
FIG. 3 is a diagram showing the process of creating a movie file from its constituent input files.

FIG. 3 depicts further details and the information that is input into the video Active Streaming Format (ASF) 130. The video ASF 130 includes a video ASF tool 330 from Microsoft Corporation, which is an MS DOS command line executable that gets its inputs from the captured time stamp data and compressed audio/video stream. The task that is completed in the video ASF 130 is the post-processing of the journaling activity. That is, the viewgraph event timing (and corresponding note timing) is combined with the AVI audio/video file that has been captured. As can be seen in FIG. 3, more specifically, the inputs include time stamps 310 from the journaling tool 124 and the AVI 320 from the audio/video capture. The time stamps are stored in a time stamp logfile that is generated by the journaling tool 124, the structure of which is shown as follows:

Start$_{13}$ marker_table
00:00:00 marker 1
00:00:41 marker 2
00:01:10 marker 3
00:01:50 marker 4
00:02:33 marker 5
00:09:59 marker 6
00:14:55 marker 7
00:16:43 marker 8
end_marker_table The time stamp logfile comprises a list of time stamps denoting view graph/note time changes in the accompanying presentation.

Using Netshow, the AVI file and the time stamp logfile are combined to create the required ASF file 340. The ASF file 340 is in a form that can be streamed from the Netshow Server in real time to the journal player. The result is an ASF movie. As the ASF movie is received by the journal player via the server 140.

The ASF movie is stored in Netshow server 140 along with other media on a web server and is now ready for streaming from the Netshow server 140 (Netshow Server is currently available from the Microsoft Corporation). This ASF movie includes the timing information from the journaling tool 124 so that a journaling playback device will be able to trap and respond to viewgraph change events as they occur. Such change events are then interpreted by programming logic within the journaling playback device such that updates can be enabled in the slideshow and notes controls. The slides themselves are actually jpeg miniatures of the presenter's viewgraphs (or any suitable image oriented content to be associated with the audio/video data). Other files to be independently created include an abstract and a table of contents. The table of contents could be simply extracted from the view graph titles. The jpeg miniatures and other files are locatable on the Netshow server 140 which is connected to the journaling tool 124. The contents of both the Netshow server are made available to a journaling playback device 150 as hereinafter described.

Figure 4:
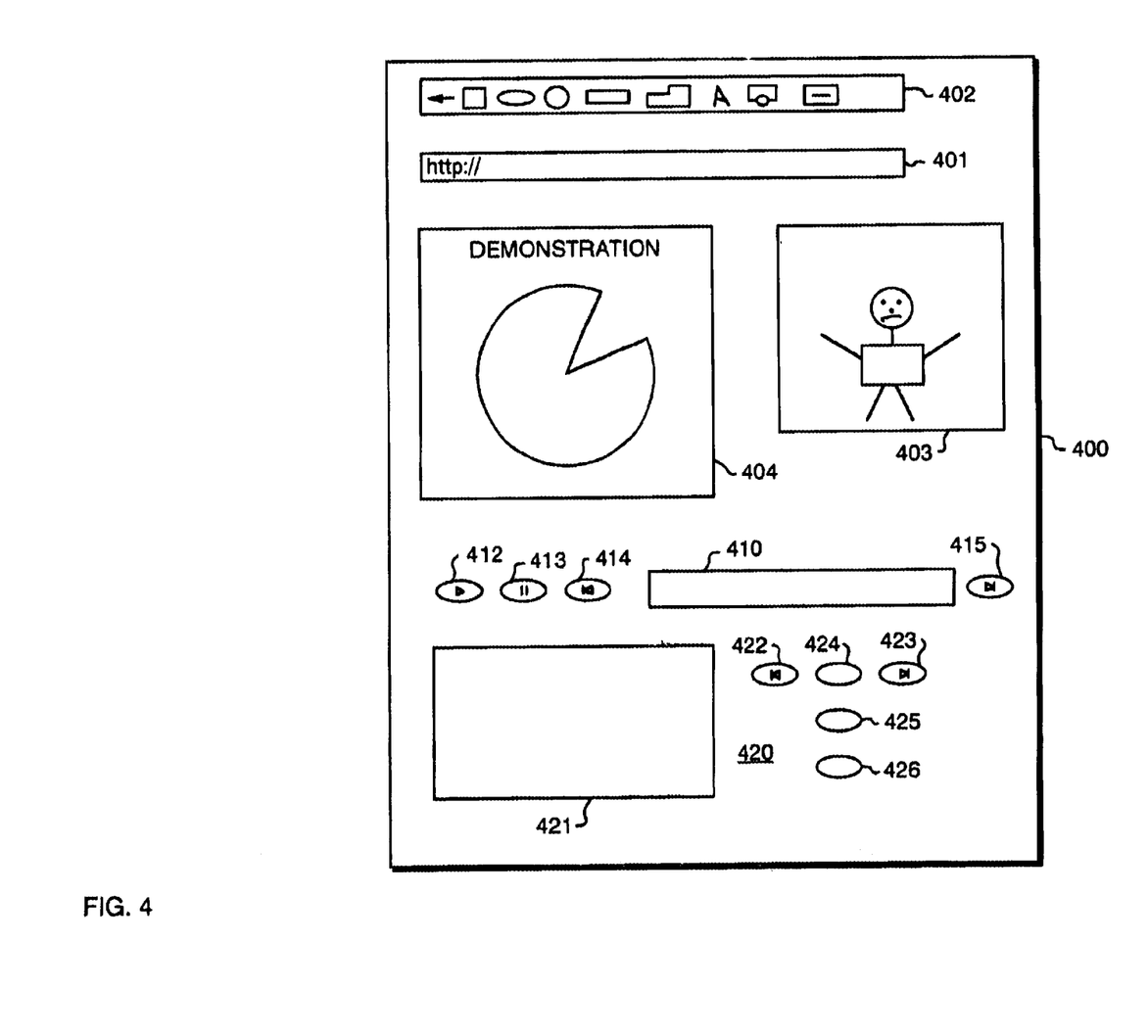
FIG. 4 is a diagram of a user interface to the tool for viewing a network-resident multimedia tool according to a preferred embodiment of the present invention.

Referring now to FIG. 4, a journal player 400, is depicted implemented as a web-based application, and hence is shown as accessed from a predetermined web site 401. As can be seen, a web command window 402 is the web based application interface, i.e., a Netscape Navigator or Microsoft Internet Explorer interface for allowing a user to issue commands via the web interface. The journal player 400 allows a user to playback and interact with multimedia presentations of journaled events. As the ASF movie is received by the journal player 400, Netshow ActiveX is able to raise events corresponding to the time stamps detected in the movie stream. These events are trapped and interpreted by programming logic of the journal player 400. Importantly, the journaled event is provided to the journal player 400 across a network in real time, and a base of available content can change dynamically. A talking head window 403 provides a video window that presents a talking head video of a presenter (with accompanying audio), for example. A graphics display window 404 displays graphic images, for example, the presenter's view graphs. An electronic notepad window 421 displays, for example, textual information pertaining to a presentation. A user can also create additional notes while viewing the presentation when a timing event coordinator tool is provided (to be described). Such newly created notes are kept in synchronization by the journaling tool. The notes are storable on network servers for subsequent retrieval, or for sharing amongst users (several sets of notes) in a groupware environment. The journal player 400 will present the contents of the talking head window 403, the graphics display window 404 and the electronic notepad 421 at the appropriate times.

The journal player 400 also includes a plurality of user controls for allowing a user to navigate the player to different parts of a presentation. The first set of user controls are grouped together as navigation controls 410. Navigation controls 410 include a play control 412, a pause control 413, and previous slide 414 and next slide 415. The play control 412, as the name implies, causes the presentation to begin to play, either from an initial start of resuming from a pause position. The pause control causes the presentation to temporarily freeze until the pause control 413 is again selected or the play control 412 is selected. Alternatively, the play and pause controls 412 and 413 are integratable into a single control that toggles from the play to pause function and vice versa according to the current function. A table of contents menu 411 is also included that provides a menu displaying the titles of the view graphs used by the presenter, which menu effectively acts as a table of contents for the presentation. A user may thus browse a presentation and go directly to an area of particular interest by selecting the view graph corresponding thereto. The presentation will resume synchronized playback from the point of the selected view graph. Alternatively, one could add functionality to allow a user to fast forward or fast reverse through the video itself while maintaining synchronization with the associated view graphs and notes.

A second set of user controls are the browse controls 420 that allow a user to browse the user notes that are displayed in notes window 421. There may be a one-to-one mapping of the user notes and view graphs in the journaled presentation as ensured by the journaling tool. Using the note window controls 422 through 426, the user can move back and forward any number of note pages independently of the rest of the presentation. Forward note control 422 and back note control 423 allow the user to go forward and backward through the notes, respectively. Once a desired note is found, the user can cause the journal player to resynchronize the rest of the presentation with that note by selecting a seek control 424. A new note control 425 is provided which allows the user to enter a new note, which note will be synched to the presentation at its current position upon selecting the save control 426.

Figure 5:
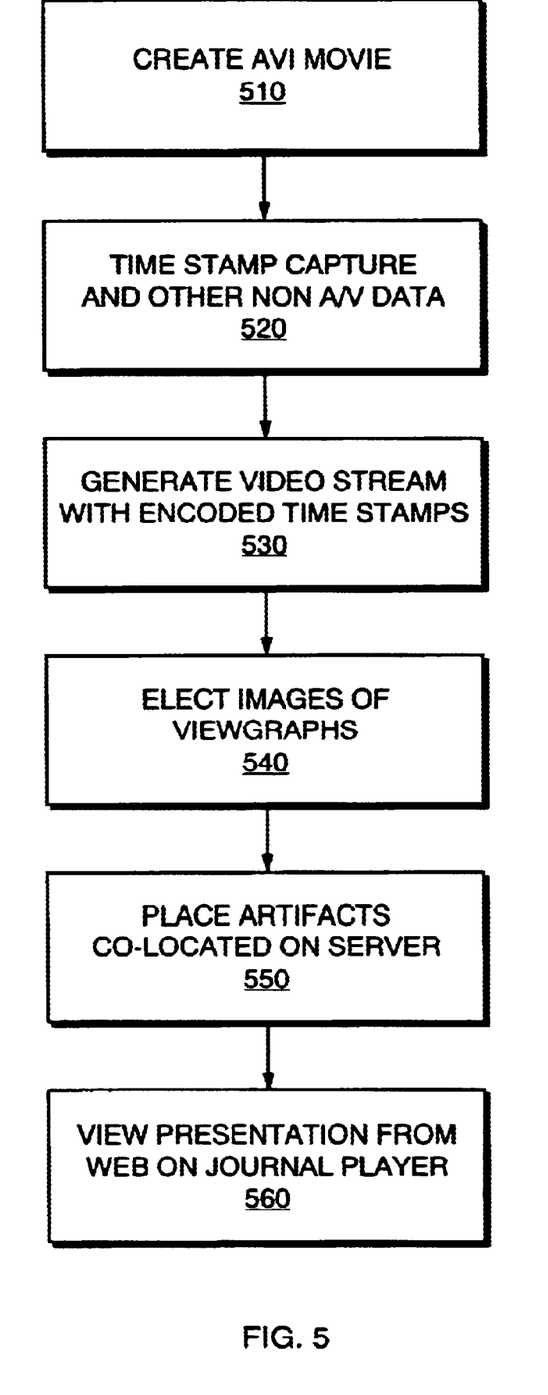
FIG. 5 is a flow diagram depicting a method for multimedia journaling in accordance with a preferred embodiment of the present invention.

FIG. 5 is a flow diagram depicting a method for carrying out a preferred embodiment of the present invention. An AVI movie is created in step 510. This step may actually be limited to an audio only capture, a video only capture, or an audio/video capture. Alternatively, the AVI movie could take the form of selecting and arranging content from preexisting sources, such as a video tape of an event. At step 520, time stamps are captured for any information related to the AVI movie of step 510. As already described, view graphs can be time stamped according to their presentation with a speaker (AVI movie). No limitation is intended in the present invention to view graphs as the AVI movie will dictate what additional content would be co-presented and hence time stamped accordingly. For example, photographs can be presented and time stamped with each introduction during a presentation. As an example, if the journaled event is a trial, then the exhibits may be time stamped when introduced and discussed. Importantly, the related information need not actually be present at this time because so long as a cue is provided that a time stamp is to be made, the content can be provided later. The time stamped related information could come from a web site or server and can be called as necessary during a presentation playback so long as the time stamp and identifying information is recorded.

Having the appropriate video and corresponding related content now being properly time-stamped, a video stream is generated at step 530 with the time stamps now encoded in the AVI movie. The images or view graphs are elected in step 540 so that during a playback these images can be located and co-displayed with the presentation. At step 550 the images and any other artifacts for playback of a presentation are stored on appropriate servers. The playback of the presentation on a journal player is accomplished at step 560. The user requests a presentation to be played back by selecting such presentation from a list, which presentation will be accessed from its web site address and the presentation is provided to the journal player with the images, notes, and other non-presentation information being downloaded to the player from their corresponding server locations.

Netshow, as described heretofore, is effective for synchronizing the several media elements or software components based on events as they occur, for example, during a video stream. However, an existing limitation is that all time stamp information to be embedded in such video stream must be known a priori, that is, at compile time when the ASF movie is generated. While this provides a preferred realization for those instance where interactive synchronization is not required and the convenience of using currently available off-the-shelf products is desired, this does not provide a flexibility to allow users to generate their own notes any time during playback (i.e., runtime synchronization). An alternative involves using a timing event coordinator for creating time stamps post video stream.

Not only is additional flexibility achieved, but additional functionality of the real-time multimedia journaling is achieved as well by using a timing event coordinator in place of the Netshow element. The timing event coordinator keeps time and coordinates events among software components that exhibit temporal state changes. Use of the timing event coordinator herein will be described in an environment for synchronizing components within a presentation. However, one skilled in the art will recognize that application of the timing event coordinator is not limited to presentation type events. A presentation typically engages a user, has some initial state, $T_{begin}$, and changes state at discrete times as the presentation progresses to an end time, $T_{end}$. The coordinated components are the separate pieces of the presentation (events) that are required to change state at discrete times.

Figure 6:
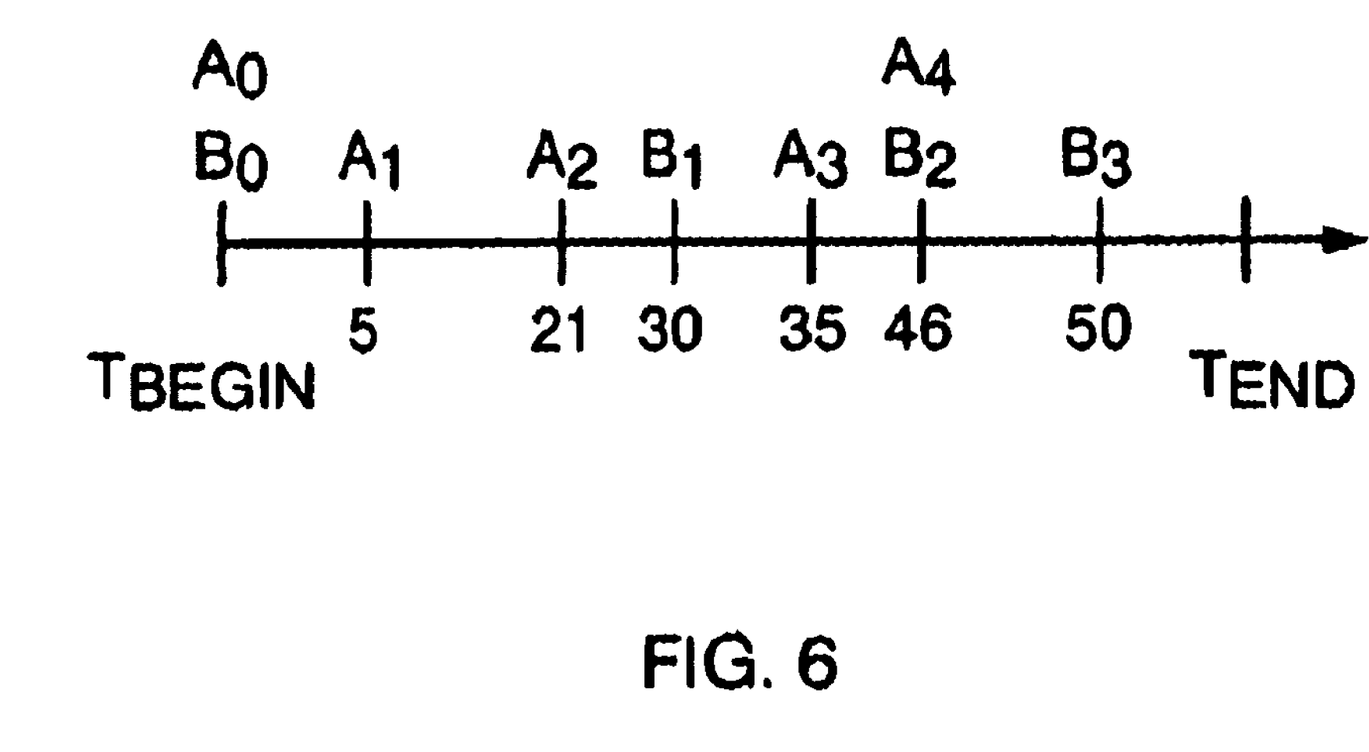
FIG. 6 is a presentation timeline depicting a relationship between multiple events relative to their respective timing.

FIG. 6 is an example timeline 601 for a presentation having only two coordinated components, A and B. The timeline 601 includes numbered state changes for each component. For example, component A represents view graph change events having an initial state $A_0$ at the start of the presentation and first changes state at $A_1$. Component B represents note change events, for example, and has an initial state $B_0$ and first changes state at $B_1$. A synchronized application can be created by having each component maintain its own time relative to the start of the presentation, $T_{REL}$. Alternately, each component will rely on a dedicated timing coordinator for notification to change states. This approach is described in more detail below.

The timing event coordinator maintains state information for each component for the set of times, S, each relative to the presentation start time, $T_{REL}$, as to when they should change their state. Thus for component A, S={$A_0$, $A_1$, $A_2$, $A_3$, $A_4$}. In addition to registering a set of time events with each component, a type is used to differentiate the components, i.e., A=view graphs, B=notes. Each type has an index associated with each time, which index identifies the sequential relationship or order (the first state for that type, the second state, etc.). Still further, each type has a flag associated therewith to provide information as how to treat that type. As an example, the flag may be as simple as a "0" or a "1" in order to differentiate between two different treatments, that is, "0" means treat special, "1" means no special treatment. Special treatment, in this example, requires that if a user jumps to a certain location in a presentation, then that component type with the "special flag" set should be treated so as the most current component relative to that location, should be displayed.

Thus, when each component registers its set, S, the timing event coordinator merges S into a table of triples having value, type and index for each element of S, for which a flag will also be associated. For the timeline provided in FIG. 6, the table of combined sets, C, is as follows:

C={(0,1,0) (0,2,0) (5,1,1) (21,1,2) (30,2,1) (35,1,3) (46,1,4) (46,2,2) (50,2,3)}.

The first two triples of C describe components A and B respectively and refer to their initial values at time zero, with A represented as a type one, and B represented as a type two, each having an index initially at zero. The third triple in C is associated with component A for a time equal to five seconds, and has an index of "1" (the second A in the set).

The timing event coordinator supports an interface that allows a component to set the time $T_{REL}$ to an arbitrary time value, V. If this occurs, the timing event coordinator looks in C for a matching time value. If a match is found, events are generated with the corresponding type and index fields. These events are used to instruct the component represented by the associated type to perform that action required at that time. If no matches are found, the timing event coordinator looks to the next greater triple in C, calculates the difference between the current $T_{REL}$ and sets a timer to raise an event at this time difference. Each time and event is raised by the timer, the period to the next event is determined for the next greater time value and the timer is set accordingly. This is repeated for each next greater time value. A reference for the timer concerning where in the video stream the event occurs is maintained by creating a series of predetermined time stamps in the video stream. That is, a time stamp is created every second with no component or event associated therewith. The granularity of such predetermined time stamps is determined according to the specific application requirements.

The timing event coordinator is implemented as an ActiveX control and can be used within Internet based applications including software components based on Java applets or ActiveX controls. Niether Java applets or ActiveX controls are intended to be a limitation in the timing event coordinator. In a typical application of the timing event coordinator, VBScript code within the application registers view graph change events with the timing event coordinator. The registration is with the type="1," flags and the set, $S_1 = \{t_0, t_1, t_2, \ldots t_n\}$ of time stamp values. These time stamp values represent the times relative to the start of the presentation (as defined by the audio/video record of the presentation) when view graph change events occurred. For example, $t_4$ would represent the time when the fifth view graph change occurred.

The notepad component registers with the timing event coordinator with type=2, flags and the set, $S_2 = \{u_0, u_1, u_2, \ldots U_n\}$ of time stamp values. These time stamp values represent the times relative to the start of the presentation that the individual notes were submitted. The timing event coordinator merges the notepad component registered timestamp information with the previously registered view graph display component time stamp information.

If a user selects "goto note three" the application would contact the timing event coordinator and instruct it to go to type=two, index=two. The timing event coordinator responds by generating two events, one to the notepad component requesting a change to note three, and one to the view graph display component requesting a change to the view graph that would be present at this point in the presentation. Additionally, the application will invoke an operation on the timing event coordinator to get the current $T_{REL}$ at the note three point. This is used to inform the audio/video component where to seek to in the associated media stream. Unless otherwise directed by the user, the application will proceed in normal fashion through the remainder of the presentation.

A benefit of the timing event coordinator is that users are now able to make new notes at runtime (in addition to those already recorded). A user viewing a presentation could take a note at any given point in the presentation. The notepad component would contact the timing event coordinator to get the current $T_{REL}$ at the new note point. After the note is complete the notepad component would contact the timing event coordinator and re-register its timing information using the same type as before. This new note could immediately function as the other notes. Still further, other users could make their set of notes available, for example, from a server, such that a group of users could share notes.

Figure 7:
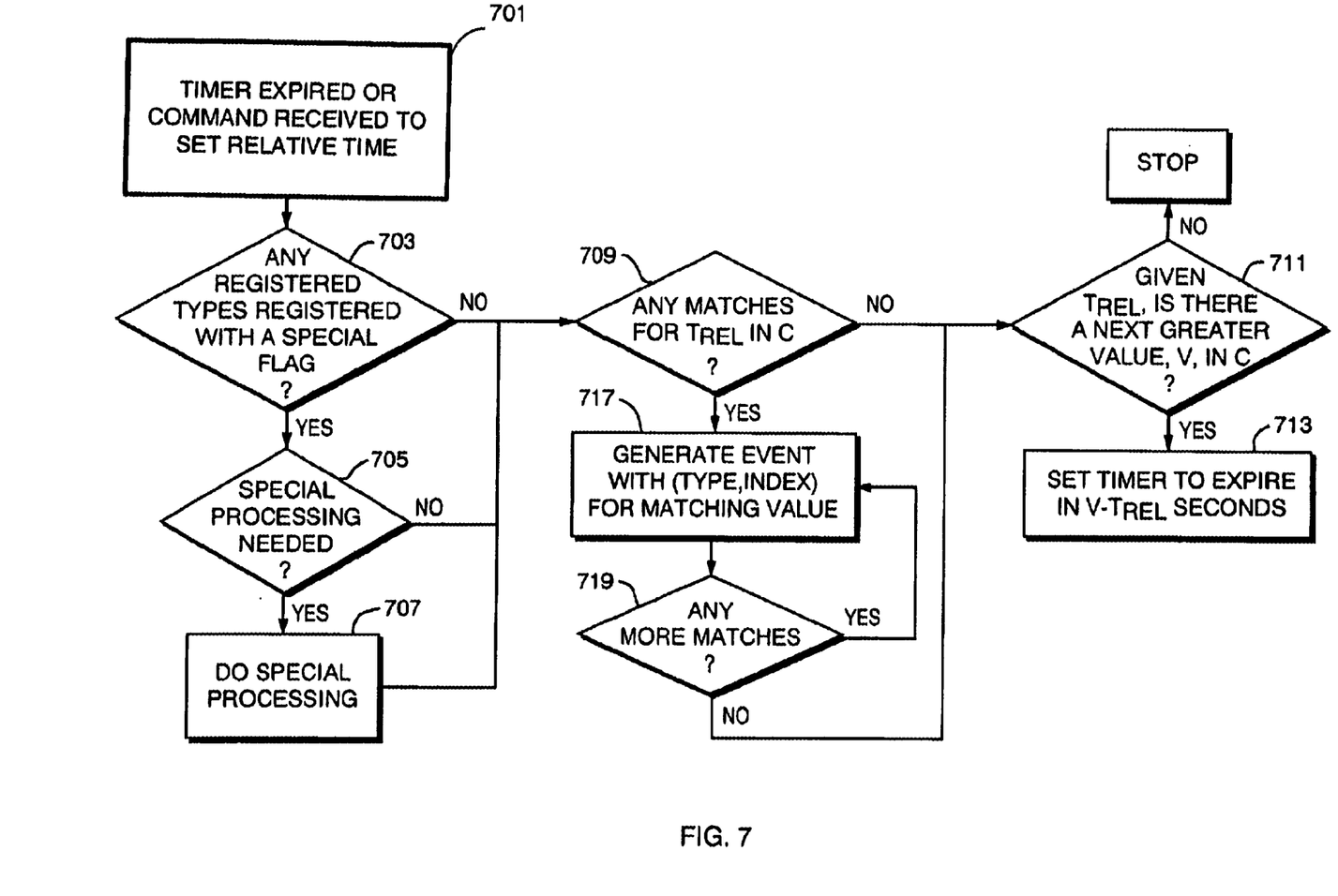
FIG. 7 is a flow diagram showing a method of providing timing event coordination.

Referring now to FIG. 7, a timing event coordinator is shown in flow diagram form for synchronizing interrelated components in a presentation as described above. The timing event coordinator method begins at step 701 which represents either the start of a presentation, or is caused by a user request to go to a certain time or event. At step 703 a test is made to determine whether any of the registered software component types have a special flag associated with them. Thus, if any one of the software components has a special flag, the result of the test will always be yes and control will flow to step 705. Assuming that a special flag is associated with one of the software components, a second test as to whether any special processing is needed is made at step 705. An example of special processing, for example, includes determining whether one or more software events need to be updated (or not updated) to the requested command and its associated time. A certain application of a journaled presentation may require that a view graph be updated to the requested time or command, but not the associated note, hence requiring special processing. Step 707 carries out such special processing.

If no special flags were detected in step 703, processing goes directly to step 709 where a test is made for matches in the relative time, $T_{REL}$, and the software components. A lack of any software component matches causes processing to proceed to step 711 wherein the presentation is restarted at $T_{REL}$ and a check is made to determine whether there is a greater time value, V, left in the presentation. A greater time value V will be treated in step 713 such that the difference between V and $T_{REL}$ is calculated and the timer is set to expire in that calculated time period. Control then returns to step 701. If there is not a greater time value, V, then the playback is concluded. Going back to step 709, if a match was found for $T_{REL}$ and the software component, then step 719 is executed where an event is generated such that the index for the type and index for that matching value. Step 719 is performed if more than one match was found (i.e., a note and view graph changed simultaneously). Steps 717 and 719 are repeated until all matches are processed before control is given to step 711.

While the invention has been particularly shown and described with reference to preferred embodiments thereof, it will be understood by those skilled in the art that various changes in form and details may be made therein without departing from the spirit and scope of the invention. The invention has been described using several commercial off the shelf products, which are not meant to be limitations as alternative products may be substituted given they provide suitable functionality for performing the required-tasks. Still further, the media journaler has been described using a presentation as the application environment. The use of the media journaler is no way intended to be limited to presentations, which has been used for convenience in describing the tool. For example, there is no inherent limitation that the coordinated events be limited to presenters, view graphs and notes. Changes in future embodiments of the invention can therefore be made without departing from the teachings herein.

What is claimed is:

1. A timing event coordinator for maintaining a record of relative times of time-related components exhibiting temporal state changes, said timing event coordinator comprising:

means for marking a base event with reference marks;

means for time stamping said time-related components to synchronize said time-related components to said base event, each time-related component of said time-related components having time stamps that are independent of each other;

means for creating a unified view of time indicating a type for each of said time-related components and their corresponding time stamps and an index for said each time-related component;

means for creating a presentation by providing events from said unified view of time to an application to allow said time-related components to act according to status of said base event;

means for receiving, subsequent to said creating, at least one new time-related component from an end user during a viewing of said presentation by the end user, said at least one new time-related component including notes relating to said presentation; and means for integrating said at least one new time-related component into said presentation to create a new presentation.

2. The timing event coordinator according to claim 1 further comprising means defining a special status flag to each time-related component type.

3. The timing event coordinator according to claim 2 wherein said unified view of time is available shortly after the base event occurs.

4. The timing event coordinator according to claim 3 wherein said unified view of time is modified by adding new time-related components that are time stamped by said means for time stamping.

5. The timing event coordinator according to claim 3 wherein said base event is an audio/video stream.

6. The timing event coordinator according to claim 5 wherein said time-related components comprise view graphs and user notes.

7. The timing event coordinator according to claim 6 wherein a new set of notes having a new type and independent time stamps is created after said base event.

8. The timing event coordinator according to claim 7, wherein said timing event coordinator further comprises:

means for receiving a command to set a relative time to a user specified time;

means for determining whether a special flag exists in any of the time-related component types;

means for processing any requirements dictated by a special flag;

means for determining whether any time-related components have a time stamp matching the relative time;

means for displaying the appropriate time-related components according to the special flag and time stamps associated therewith.

9. A media journaler for creating a multimedia presentation of a recordable event having time-related components associated therewith and having a timing event coordinator for maintaining a record of relative times of said time-related components, said media journaler comprising:

an audio/video capture device for providing an audio/video file of a recorded event; and a journaling tool for creating at least one streamable audio/video file representing said recordable event and corresponding time stamp information, said journaling tool including said timing event coordinator, said timing event coordinator further comprising:

a base event marker for marking a base event with reference marks, time stamping device for time stamping said time-related components to synchronize said time-related components to said base event, each time-related component of said time-related components having time stamps that are independent of each other, unified view of time indicating a type for each of said time-related components and their corresponding time stamps and an index for said each time-related component, and processing element configured to create a first multimedia presentation by providing said unified view of time to an application to allow said time-related components to act according to a status of said base event, receive at least one new time-related component from an end user during a viewing of said first multimedia presentation by the end user, said at least one new time-related component including notes relating to said first multimedia presentation, and integrate said at least one new time-related component into said first multimedia presentation to create a second multimedia presentation.

10. The media journaler according to claim 9 wherein said audio/video capture device is a video camera.

11. The media journaler according to claim 10 wherein said video camera is a digital video camera.

12. The media journaler according to claim 9 wherein said journaling tool receives an analog or digital audio/video stream from said audio/video capture device.

13. The media journaler according to claim 12 wherein said journaling tool is a standalone or network-based application.

14. The media journaler according to claim 12 wherein said journaling tool comprises:

a video window;

a view graph window; and a notes window.

15. The medial journaler according to claim 12 further comprising:

a journal player configured to present said first multimedia presentation to a user, receive said at least one new time-related component during said presenting, and send said at least one new time-related component to said processing element.

16. The media journaler according to claim 15 wherein said time-related components are stored in one or more network servers for retrieval by said journal player when playing said multimedia presentation.

17. In a timing event coordinator, a method of creating a multimedia presentation of a recordable event having time-related components, said multimedia presentation created within minutes of said recordable event, said method comprising:

creating a movie of said recordable event;

capturing time stamp information for synchronizing said time-related events to said recordable event;

generating timestamped versions of said movie with reference marks encoded therewith;

time stamping time-related components to synchronize said time-related components to said movie, each time-related component of sad time-related components having time stamps that are independent of each other;

creating a unified view of time indicating a type for each of said time-related components and their corresponding time stamps and an index for said each time-related component;

providing said unified view of time to an application to allow said time-related components to act according to status of said movie;

generating at least one stream including said movie with captured time stamps encoded therewith;

electing images of time-related events and coupling said images to said movie according to said time stamp information to create a presentation;

receiving, subsequent to said electing, new time-related components from an end user during a viewing of said presentation by the end user, said new time-related components including notes relating to said presentation; and integrating said new time-related components into said presentation to create a new presentation.

18. The method according to claim 17 wherein said movie and images are located on web servers.

19. The method according of claim 18 wherein said journal player is a web based application that retrieves said media presentation from said web servers.

* * * * *